United States Patent [19]

Wei

[11] 4,432,611
[45] Feb. 21, 1984

[54] PHOTOCONDUCTOR CONTROL OF ELECTRO-OPTICALLY VARIABLE DISPLAY CELL

[75] Inventor: John S. S. Wei, Roanoke, Va.

[73] Assignee: Northern Telecom Limited, Montreal, Canada

[21] Appl. No.: 200,138

[22] Filed: Oct. 24, 1980

Related U.S. Application Data

[63] Continuation of Ser. No. 948,624, Oct. 3, 1978, abandoned.

[51] Int. Cl.³ .............................................. G02F 1/13
[52] U.S. Cl. .................................... 350/342; 350/333; 350/336
[58] Field of Search ................ 350/342, 336, 349, 393

[56] References Cited

U.S. PATENT DOCUMENTS

| | | | |
|---|---|---|---|
| 3,551,026 | 12/1970 | Heilmeier | 350/349 |
| 3,705,310 | 12/1972 | Wild | 350/336 |
| 4,110,014 | 8/1978 | Yevick | 350/342 |

Primary Examiner—John K. Corbin
Assistant Examiner—Paul M. Dzierzynski
Attorney, Agent, or Firm—Stuart L. Wilkinson

[57] ABSTRACT

Light transmitted by an electro-optically variable cell on application of a voltage actuates a photoconductor which controls the voltage. Voltage is, for example, applied across both a liquid crystal and a photoconductor, control then deriving from a relative change in impedance of the liquid crystal and photoconductor. High contrast and a hysteresis effect permit multi-cell adaptation using a high order of multiplexed addressing.

7 Claims, 4 Drawing Figures

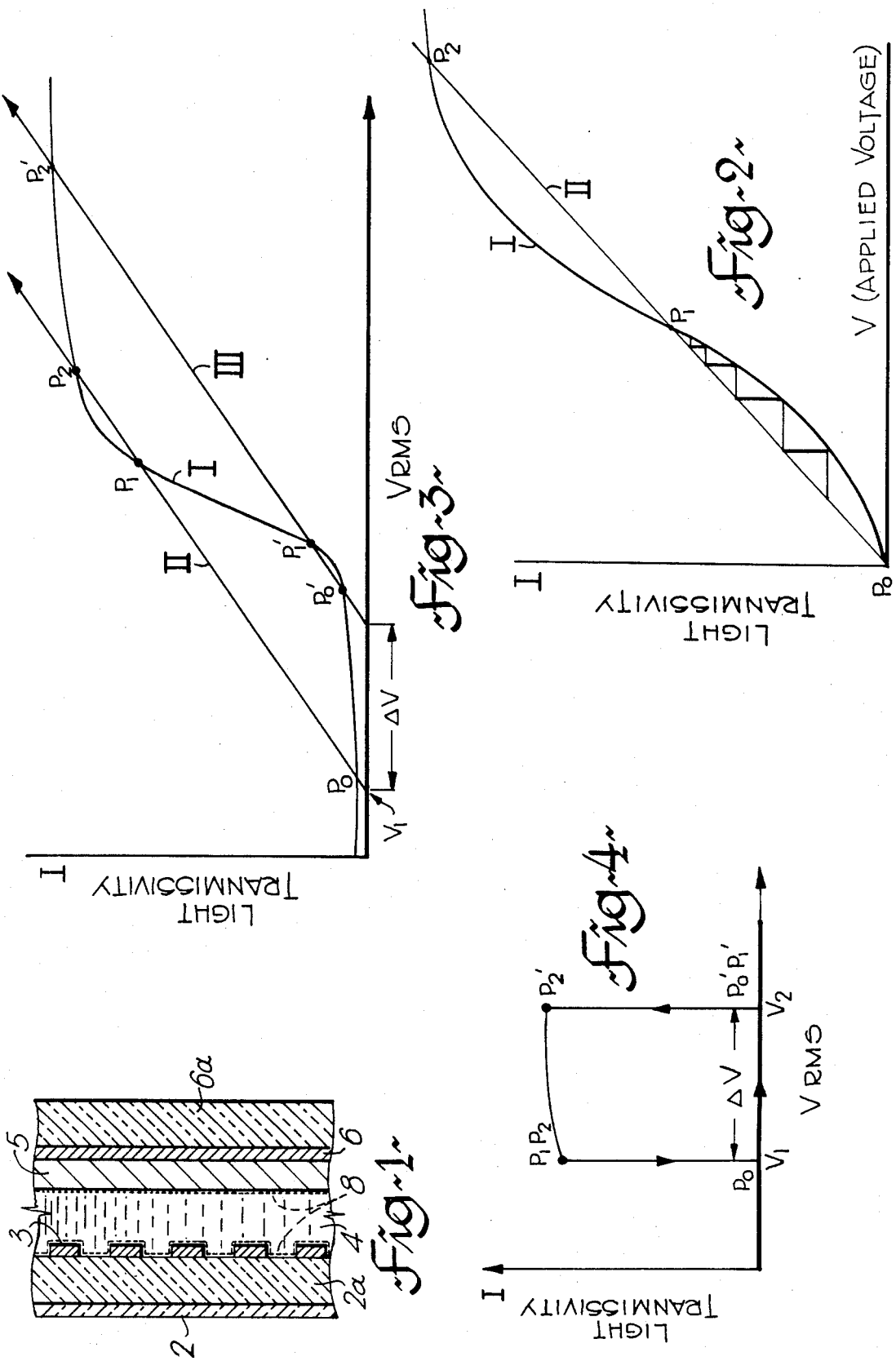

PHOTOCONDUCTOR CONTROL OF ELECTRO-OPTICALLY VARIABLE DISPLAY CELL

This is a continuation of application Ser. No. 948,624, filed Oct. 3, 1978, now abandoned.

The invention disclosed in this specification relates to the structure of electro-optically variable cells, for example liquid crystal display (LCD) cells, which find particular application in complex display panels.

Liquid crystals are materials which, although possessing physical characteristics of a liquid, show, under certain conditions, long range orientation order. Like crystalline solids, they may modulate light transmitted through them—for example, by differentially transmitting polarized components of the light. Unlike crystalline solids however, the orientation of liquid crystal molecules can be altered rapidly by altering the surrounding conditions. In particular, a liquid crystal can be used as a light switch using a-c field excitation. For this property, liquid crystals have found widespread application in alphanumeric display panels for use, for example, in hand calculators and digital watches.

To operate such a display panel of a size sufficiently extensive to accommodate, for example, sixty-four characters with thirty-five (7×5) individually controllable cells per character, an effective addressing technique is clearly needed. To avoid a dedicated pair of leads to each cell, a multiplexing technique is adopted. In the example suggested, the 2240 cells might be addressed by 75 conductor strips, 40 of the conductors arranged in parallel columns to flank the cells on one side and 35 of the conductors arranged in parallel rows to flank the cells on their other side. Where one of the column conductors overlaps one of the row conductors is the site of each cell location. Addressing is achieved by an appropriate potential different applied across the cell by means of the overlapping conductors. Typically, scan pulses are applied periodically to successive ones of one set, say the column conductors, while data pulses are applied, as and when appropriate, to the row conductors in order to build up a coherent display. Other addressing techniques of multiplexed character are well known in the art.

A major shortcoming of LCD cells particularly in their application to LCD panels of the type delineated is that the turn-on threshold of a LCD cell is not a sharp function of applied voltage. To access the practical implications of this, consider a cell activated by applying a rms voltage of 4 volts across it. This can be achieved by simultaneously grounding one addressing conductor and pulsing the other addressing conductor to 4 volts rms, all other conductors being maintained at an intermediate potential of 2 volts rms. Those of the cells that have not been selected but nevertheless share one or other of the addressed conductors experience that half select 2 volts rms. Were the turn-on threshold of the LCD cell a sharp function at, say 3.5 volts, this would not matter, but as shown by the graphical plot I, FIG. 2, illustrating the interdependence of light transmissivity and applied voltage for a typical LCD cell, in practice the shared cells will be partially turned on.

Supplement this with stray capacitance effects resulting from the use of a-c excitation and it will be apparent that appreciable loss of contrast can be sustained in display panels of this construction.

To overcome this limitation, the invention proposes a display cell using an electro-optically variable medium, the cell being actuatable by a voltage applied thereacross, the improvement comprising a photoconductor arranged to detect light transmitted by the medium and to produce a corresponding feedback to adjust the applied voltage. Preferably the feedback results solely from a relative change in impedance of the medium and the photoconductor; i.e. a predetermined voltage is applied across the cell so that a fraction of the voltage is presented across the medium and a fraction is presented across the photoconductor, the fraction across the medium increasing at the expense of the fraction across the photoconductor on actuation of the photoconductor until an equilibrium position is reached.

The LCD cell can comprise, in sandwich construction, a light polarizing layer adjacent a liquid crystal layer adjacent a photoconductive layer with means for applying a voltage across the liquid crystal and the photoconductive layers. In a preferred practical construction, however a first and second glass plate bound the liquid crystal and photoconductive layers, the light polarizing layer being applied to an outer surface of the first plate.

Preferably the liquid crystal layer comprises a mixture of nematic liquid crystals and pheochroic dye molecules, application of the voltage across said liquid crystal and photoconductive layers being such as to reorientate the molecules thereby to reduce absorption of light incident on the liquid crystal layer after being transmitted through said polarizing layer.

A plurality of such cells can be disposed in a regular array of rows and columns, said means for applying a voltage then including a corresponding matrix of row conducting strips and column conducting strips deposited on inside surfaces of said glass plates. The cells need not be discrete; thus the panel can have a single polarizing layer and/or a single liquid crystal layer and/or a single photoconductive layer extending throughout the area of the panel; however the conducting strips must be discrete in order to address specific regions of the panel.

An exemplary embodiment of the invention is now described in relation to the accompanying drawings in which:

FIG. 1 is a cross-sectional view of part of a display panel according to the invention showing the layered character of the panel;

FIG. 2 shows in superimposed graphical form the interdependence of the transmissivity of the LCD panel on applied voltage (I) and, indirectly, the interdependence of the photoconductive layer resistance on incident light (II);

FIG. 3 shows in graphical mode an operating regime for the LCD panel; and

FIG. 4 shows a hysteresis effect achieved by operating the panel in this regime.

As shown in FIG. 1, the display panel 1 is formed as a sandwich structure. On the rear face is a polarizing layer 2; adjacent that, a glass plate 2a supports parallel vertically oriented conducting strips 3; next adjacent, a layer of liquid crystal 4; next adjacent a layer 5 of photoconductive material; and at the front face a region of parallel horizontally oriented conducting strip 6 supported on another glass plate 6a. The conducting strips 3 and 6 and the photoconductive layer 5 are substantially transparent.

The purpose of the vertical and horizontal conducting strips 3 and 6 is to address specific areas or cells in the panel 1. A-C or pulsed excitation is used to actuate liquid crystals since d-c excitation causes long-term deterioration. The strips 3 and 6 are normally maintained at an intermediate voltage, say 2 volts rms and when a particular panel area or cell is required to be addressed, then the pair of strips crossing at that area or cell are pulsed respectively to ground and to 4 volts rms. A high refresh rate is achieved by multiplexed addressing in which scan pulses are applied periodically to one set, say the horizontal strips, while data pulses are applied to the vertical strips to build up a coherent display. The vertical connecting strips 3 are defined on the inside surface of the glass plate 2a and the horizontal conducting strips 6 are printed onto the inside surface of the glass plate 6a.

A suitable material for the liquid crystal layer is a mixture of nematic liquid crystal molecules and pleochroic dye molecules. The mixture has the following properties which particularly adapt it to switchable displays. Firstly, liquid crystal molecules and dye molecules are both elongate and tend to an orientation in which their longitudinal axes are parallel. Secondly, that orientation can be altered by a-c excitation of the liquid crystal molecules. Thirdly, optical absorption of light polarized along the longitudinal axis of dye molecules is very much higher than absorption of light polarized in a direction orthogonal to this.

Referring again to FIG. 1, inner surfaces of the photoconductive layer 5 and the glass plate 2a are appropriately treated by, for example, slope evaporation of SiO molecules 8, to orientate molecules in the contacting fluid so that their longitudinal axes are horizontally disposed within the plane of the liquid crystal layer. In this orientation, horizontally polarized light 9 obtained by directing light from a display source (not shown) through the polarizing layer 2, is absorbed by the dye molecules. When a potential difference is applied between a pair of overlapping conducting strips, the liquid crystal molecules at the overlap are reorientated so that their longitudinal axes are orthogonal to the plane of the layer 4. As explained previously, the elongate dye molecules tend to align themselves with the elongate liquid crystal molecules and, in this orientation, transmit polarized light from the polarizing layer 2 with minimal absorption since the longitudinal axes of the dye molecules are perpendicular to the polarizing plane of the layer 2.

The transmissivity of the pleochroic liquid crystal layer 4 can then be represented as a function of applied voltage and this is shown as plot I in FIG. 2.

The presence of the photoconducting layer 5 modifies the behaviour of the liquid crystal layer 4. Thus, when a voltage V is applied across a selected pair of conductors 3 and 6, only a fraction of V appears across the liquid crystal layer 4 because the photoconductor layer 5 sustains a voltage drop as well. The voltage $V_{LC}$ across the liquid crystal layer is given by:

$$V_{LC}(\omega) = \frac{V \cdot Z_{LC}(\omega)}{Z_{LC}(\omega) + Z_{+H}(\omega)} \quad (1)$$

where $Z_{LC}(\omega)$ and $Z_{PH}(\omega)$ are respectively the a-c impedance of the liquid crystal and the photoconductive layers 4 and 5. Since liquid crystal cells are operated usually below 1 KHz, $Z_{LC}(\omega)$ and $Z_{PH}(\omega)$ are mostly due to capacitive contributions ($C_{LC}$ and $C_{PH}$) across the layers. With a cell size of 1 mm (i.e. the conducting strips 3 and 6 are 1 mm wide) a photoconductive layer 5 m thick and a liquid crystal layer 10 m thick, $C_{LC}$ and $C_{PH}$ are about 5 pf and 2 pf respectively.

As V is increased, the liqud crystal layer 4 starts to transmit light. This light falls on the photoconductive layer which then decreases its resistance. This drop in resistance causes a high fraction E and V to be applied across the liquid crystal layer. Because of the higher E value, the liquid crystal layer 4 transmits even more light, which effect causes the photoconductive layer 5 to further decrease its resistance. The result, at first glance, is that an avalanche switching action occurs. In fact, a closer analysis shows that there is a stable equilibrium operating point. This can be seen by superimposing the liqud crystal layer response curve (I) and the photoconductive layer photoresponsive curve (II), curve (II) being an apporoximation of the true response. As described above, the effect of an increasing voltage E across the liquid crystal layer as a function of transmitted light $I_t$ is demonstrated qualitatively. The light through the liquid crystal layer and the voltage across it must satisfy both curves I and II. The only two possible solutions are points $P_1$ and $P_2$ as shown in FIG. 2.

Suppose the operating condition has temporarily stabilized at point $P_1$. If a sudden fluctuation raises light above that level, the added light quickly decreases the photoconductive layer impedance. This results in a higher voltage across the liquid crystal layer to further increase the transmitted light level and to precipitate an avalanche effect. The same analysis holds for operation at point $P_1$ should the light level suddenly decrease. $P_1$ is therefore an unstable operating point; if the operation is temporarily at $P_1$, it rapidly tends either to $P_2$ or $P_0$. However, if the system reaches point $P_2$, stabilization occurs. Suppose the light level through the liquid crystal layer suddenly increases beyond $P_2$. Then according to the photoresponsive curve II, the voltage across the liquid crystal layer increases, but insufficiently to maintain the light as its increased level. A small decrease in light level below $P_2$ similarly has no permanent effect.

Referring to FIG. 3, it is shown that operation of a cell or panel element of this construction can be switched readily from one state into another, that is between operating point $P_0$ of zero transmissivity and operating point $P_2$ of maximum transmissivity. From equation 1, $$V_{LC}(\omega) = \frac{V \, Z_{LC}(\omega)}{Z_{LC}(\omega) + Z_{PH}(\omega)}$$

the voltage across the liquid crystal layer depends on the total applied voltage V. Thus, a voltage $V_1$ is applied to the system so that $V_{LC}$ is the voltage dropped across the liquid crystal layer. By decreasing $V_{LC}$ slightly, it can be seen that $P_1$ and $P_2$ tend to merge and curve II leaves curve I; the system then is stable only at operating point $P_0$. On the other hand, if $V_1$ is increased to $V_2$ so that $V_{LC}$ appears across the liquid crystal layer, the reverse effect occurs. It can be seen that by increasing $V_{LC}$ slightly, $P_0'$ and $P_1'$ merge. Curve III then leaves I; the system then is only stable at operating point $P_2'$, so that the cell avalanches toward a transparent state evidenced by the high transmission I at $P_2'$. This operating regime provides the desired switching characteristic.

The optical response of the liquid crystal layer as a function of the voltage across the layer is shown in FIG. 4. The cell remains in a low transmission state $P_0$ until voltage is increased to a value $E_2$. The cell then switches into state $P_2$, and once there, the liquid crystal layer voltage E must be decreased from $V_{LC}''$ to $V_{LC}'$ to switch the cell to an opaque state.

FIG. 4 clearly exhibits a hysteresis effect and two sharp transition levels $V_1$ and $V_2$. Once the cell switches into either $P_2$ or $P_0$ it is stable until a voltage difference $\Delta V = (V_1 - V_2)$ is applied. This $\Delta V$ provides a degree of buffering against fluctuations. Also the sharp transitions mean that unselected elements are not partially activated—an element is either ON or OFF thereby increasing the display contrast of selected elements. With the enhanced display contrast, more addressing conductors can be multiplexed together and construction and temperature compensation requirements can be relaxed.

It will readily be appreciated that the invention is applicable not only to liquid crystals of the pleochroic type but can be used to modify the light transmission—applied voltage characteristics of other electro-optically variable media to obtain a distinct switching threshold. Furthermore, methods of applying feedback to the liquid crystal-photoconductor combination other than relying on the relative change in impedance will be apparent to those skilled in the art. In the embodiment described the photoconductor has been used to provide positive feedback with its consequent advantages of a threshold and hysteresis effect. Clearly, appropriate circuitry can be used to derive a negative feedback effect, for example, to provide a uniform panel illumination when light of varying intensity is incident upon the panel.

What is claimed is:

1. A display panel comprising:
    a layer of electro-optic material having optical transmissivity increasing with increasing electric field intensity thereacross;
    immediately adjacent to the layer of electro-optic material, a layer of photoconductive material having conductivity increasing with increasing light intensity incident thereon;
    a first set of conductors contacting the photoconductive material layer on a side thereof remote from the electro-optic material layer;
    a second set of conductors located on a side of the electro-optic material layer remote from the photoconductive material layer;
    a plurality of crossovers at which conductors of one set cross over conductors of the other set, the crossovers defining a plurality of display cells, each display cell comprising an area of the electro-optic material layer and an immediately adjacent area of the photoconductive material layer located to receive light transmitted by said area of the electro-optic material layer; and
    means for applying a voltage between pairs of conductors at selected crossovers;
    wherein the electric field intensity-optical transmissivity characteristic of the electro-optic material, the conductivity-light intensity characteristic of the photoconductive material, and impedances of the electro-optic material and the photoconductive material at a selected cell are so related that below a threshold voltage no light is transmitted across the cell, and above the threshold voltage light is transmitted across the cell.

2. A display panel as claimed in claim 1, the panel particularly adapted for use with monochromatic light, the panel having a polarizer on the side of the electro-optic material layer remote from the photoconductive material layer, the electro-optic material comprising a mixture of a nematic liquid crystal and a pleochroic dye, the dye characterized by an absorption band including the wavelength of said monochromatic light, the extent of such absorption depending on angular orientation of molecules of said pleochroic dye to the axis of polarization of polarized light incident on the dye.

3. A display panel as claimed in claim 1 the panel having a first glass plate adjacent the photoconductive material layer and a second glass plate adjacent the electro-optic material layer, the photoconductive material layer and the electro-optic material layer being sealed between the glass plates and the first and second sets of conductors being formed on inside surfaces of the first and second glass plates respectively.

4. A display panel as claimed in claim 2, in which an inner surface of the glass plate adjacent the electro-optic material layer, and a surface of the photoconductive material layer contacting the electro-optic layer are both configured to align molecules of the liquid crystal parallel to the plane of the electro-optic layer in the absence of an applied electric field.

5. A display panel as claimed in claim 1, in which the conductors are transparent.

6. A display panel as claimed in claim 3, in which the glass plate adjacent the photoconductive material is reflective whereby light incident thereon from a selected cell, is reflected back through the cell.

7. A display panel as claimed in claim 1 in which the conductors of one set are substantially identical to one another, equispaced, parallel and extending in a row direction and the conductors of the other set are substantially identical to one another, equispaced, parallel and extending in a column direction.

* * * * *